Figure 1:
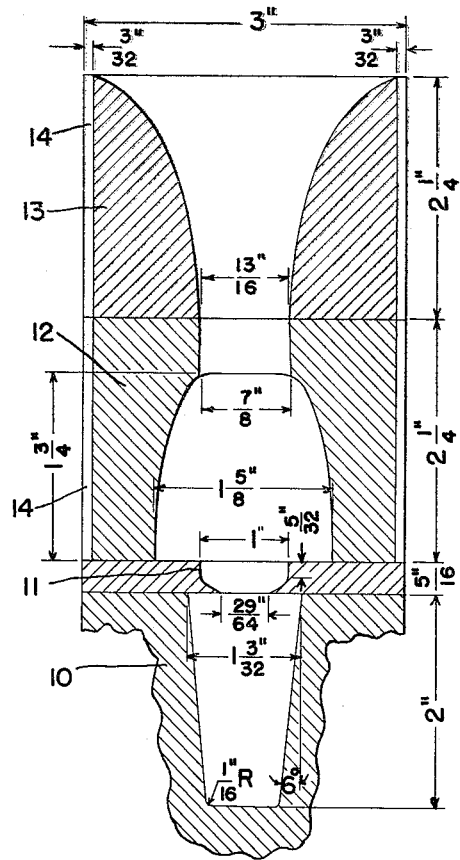

Sept. 11, 1962 S. LIPSON ETAL 3,053,075
APPARATUS FOR MEASUREMENT OF GAS IN METAL
Filed Jan. 18, 1960 2 Sheets-Sheet 1

INVENTORS
SAMUEL LIPSON
HARRY V. SULINSKI
BY
*J. J. Rotondi, A. T. Dupont*
*& S. Rubroff* ATTORNEYS:

INVENTORS
SAMUEL LIPSON
HARRY V. SULINSKI

ATTORNEYS:

3,053,075
APPARATUS FOR MEASUREMENT OF GAS IN METAL
Samuel Lipson and Harry V. Sulinski, Philadelphia, Pa., assignors to the United States of America as represented by the Secretary of the Army
Filed Jan. 18, 1960, Ser. No. 3,214
3 Claims. (Cl. 73—19)
(Granted under Title 35, U.S. Code (1952), sec. 266)

The invention described herein may be manufactured and used by or for the Government for governmental purposes without the payment to us of any royalty thereon.

This invention relates to the measurement of the gas content of metals such as aluminum, copper, magnesium and alloys of these metals. Its purpose is to provide an improved apparatus whereby the gas content of such metals may be measured on the production foundry floor rapidly and with a satisfactory degree of accuracy. It is hereinafter described as applied to aluminum.

Various techniques have been developed for the production of premium quality aluminum castings suitable for use under critically stressed conditions such as those encountered in the operation of missiles, lightweight armored vehicles, aluminum armor and the like. Among these techniques is the reduced pressure solidification test which is extensively used in experimental work and industry for determining the gas content of an aluminum melt.

The reduced pressure solidification test involves permitting a sample of metal taken from the melt to solidify at reduced pressure. The gas precipitated from the melt occupies a volume which is related to the solidification pressure in accordance with Boyle's law. For example, if 0.1 an atmosphere is used, the volume occupied by the gas is magnified by a factor of 10.

The sample is usually qualitatively evaluated by examining the appearance of the free surface of the specimen. For these premium quality castings, however, qualitative estimates of the volume of gas in the melt are inadequate. Either sectioning of the sample to detect evidence of gas holes or density measurements are employed to insure that the degassing operation has been taken to completion. Both of these methods for evaluation of the test specimen leave something to be desired. The sectioning method requires careful polishing of the sample to avoid smearing over the gas holes, and the density measurement is equally time consuming and cumbersome.

The present invention avoids these difficulties by the provision of a quantitative method which may be performed very quickly to measure the gas content of the metal. According to this method, the gas content is determined by a single weighing of a standard sized sample which is solidified at approximately 0.1 atmospheric pressure. The preferred size of the sample is 20-cc. It is formed in a resin bonded shell mold and knock-off riser system designed to afford close control of the as-cast volume of the sample. Empirical values of gas content can be obtained with a standard deviation of 0.002 cc./100 gm. The method requires only 4½ min. and is performed by apparatus rugged enough to be used on the production foundry floor.

The sampling of an accurately controlled volume of metal by ladling from a crucible is not possible because of practical difficulties associated with handling of molten metal. This difficulty is avoided in this invention by control of the desired volume of metal in the mold. The excess metal is used for feeding purposes and is contained in a separate section which is discarded after the specimen has solidified.

The invention will be better understood from the following description when considered in connection with the accompanying drawings and its scope is indicated by the appended claims.

Figure 3:
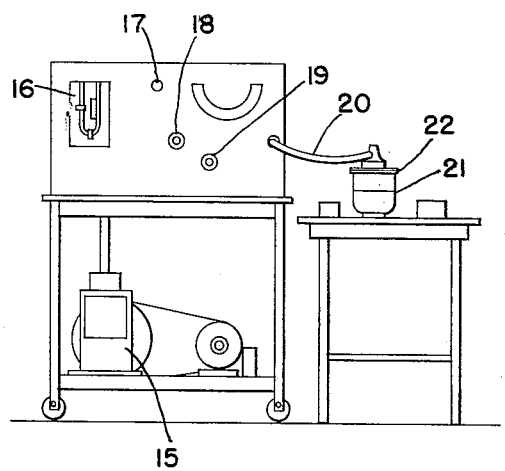
Figure 2:
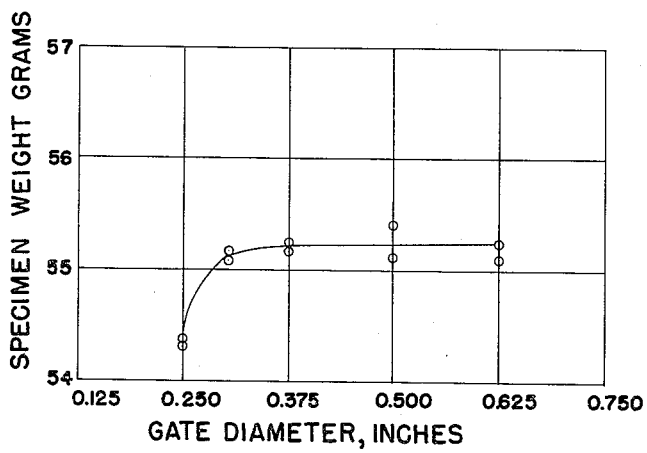
Figure 6:
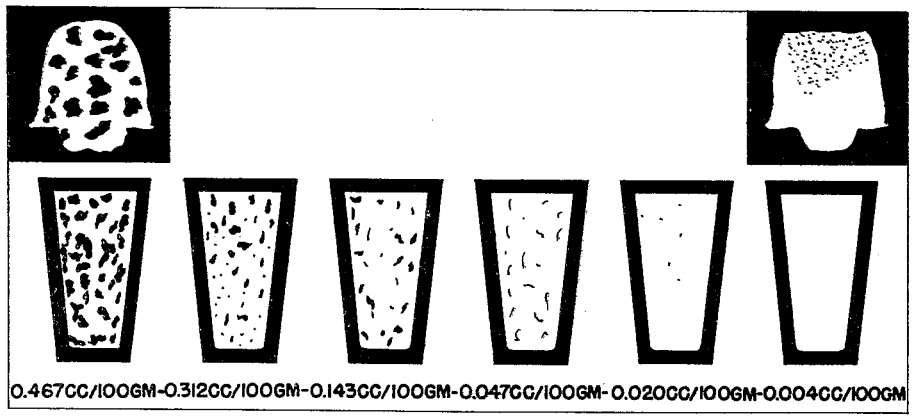
Figure 4:
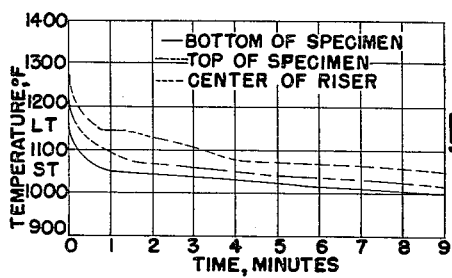
Figure 8:
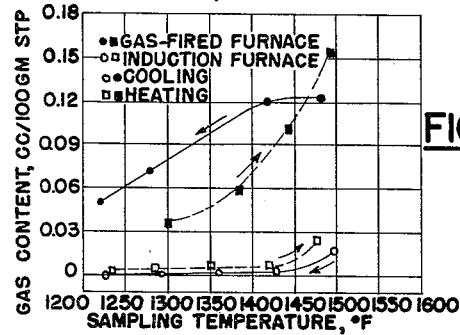
Figure 5:
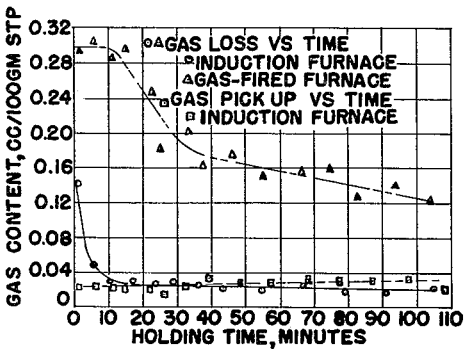
Figure 9:
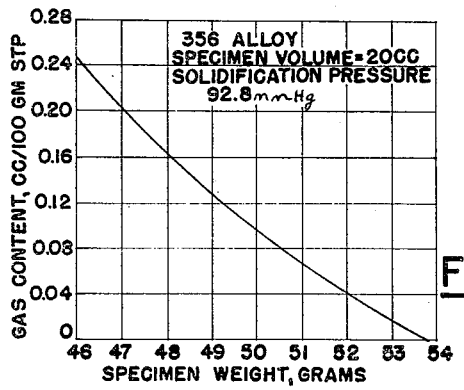
Figure 7:
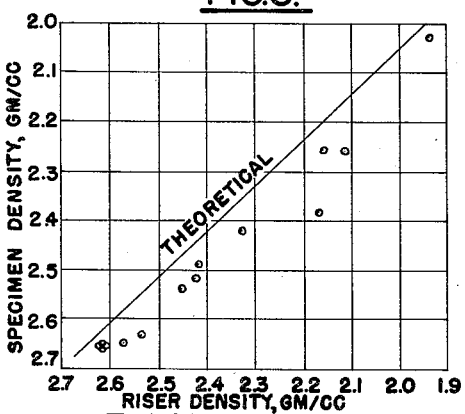

Referring to the drawings,

FIG. 1 is a sectional view of the constant volume mold used to form the test samples, FIG. 2 is a curve showing the relationship between the gate diameter of the mold and the weight of the test specimen, FIG. 3 illustrates the reduced pressure test apparatus used to produce the constant volume test sample, FIG. 4 shows the temperatures at different points in the sample casting at successive intervals of time, FIG. 5 is a set of gas loss and pickup vs. time curves for gassed and degassed heats of metal melted in induction and gas-fired furnaces, FIG. 6 are sections of constant volume specimens having different gas contents, FIG. 7 indicates the experimental and theoretical relations between the densities of the specimen and riser sections of the sample casting, FIG. 8 is a set of curves depicting the effect of sampling temperature on the gas content of the constant volume sample, and FIG. 9 is a curve plotted between the weight of the constant volume sample and the gas content of the metal at a standard temperature and pressure, this content being expressed in cc. per 100 gm. As hereinafter explained this calibration curve is utilized to convert the weight of the constant volume sample to the gas content of the melt from which the sample is taken.

As indicated by FIG. 1, the device for producing the test sample is a mold, 10–13 consisting of a test specimen forming section 10, a choke gate 11, a riser 12 and a removable pouring basin 13. The riser and basin are surrounded by a steel casing 14. The various dimensions of the device are as indicated on the drawing.

The design or shape of the specimen must be such as to insure adequate feeding under all conditions of test. This is so because the problem of feeding the sample becomes most difficult and significant when the sample contains little or no gas. An improperly risered specimen under these conditions will develop shrinkage cavities which, on the basis of the test parameters, will be indistinguishable from voids resulting from gas. A truncated cone form of mold was adopted because of its favorable geometry with respect to feeding.

The size of the specimen was selected on the basis of the needs of the test. A large specimen would provide the maximum in sensitivity. The solidification time, however, would become excessive and defeat the purpose of the test which is to provide a rapid measure of gas contained in the melt. A compromise size of 20 cc. was finally selected. This requires a solidification time of slightly better than 2 minutes, which, on the basis of previous work, was considered to be optimum.

The test specimen portion 10 of the constant volume mold is made by a shell molding process, utilizing a semi-automatic shell molding machine. The specimen molds consist of a mixture of 94.8% silica sand (AFS fineness 120–150) 5% resin, and 0.2% kerosene. The shell is approximately ⅜ inch thick.

The choke-type gate 11 serves a threefold function. It acts as a channel through which the metal flows into the test segment of the mold, it provides a hot spot for maintaining a fluid channel for feeding, and it provides a notch so that the riser segment of the casting can be readily separated from the constant volume specimen. The optimum size of the gate was determined by making constant volume castings with gates varying in diameter from 0.250 in. to 0.625 in. As indicated by the curve of FIG. 2, a minimum gate opening of about 0.300 in. is necessary to insure satisfactory feeding of the casting. A gate diameter of 0.453 was adopted. It was found that the angle formed between the gate and specimen by drilling 29/64 and 1 in. diameter holes must be sharp and unrounded for the reason that a rounded angle generally results in an irregular type fracture.

The riser type reservoir 12 and removable funnel shaped pouring basin 13 (FIG. 1) were made of nonferrous investment (70% silica and 30% gypsum) material consisting of 1¼ pounds of investment and 300 cc. of water. As shown in FIG. 1 the reservoir in section 12 is of larger volume that the recess in the lower mold section 10. This is for the purpose of enabling the reservoir in part 12 to function as a heat and metal supply for the metal to be cast in section 10. After the plaster molds had set (15 to 20 min.) and the patterns had been removed, the molds were dehydrated and calcined in an oven for 16 hours at 600° F. The plaster molded riser and pouring basin were enclosed in a 3-inch diameter hollow steel cylinder, 3/32 inch thick and 2¼ inches in height. This enables the riser and pouring basin to be reused many times. Plaster molds, when allowed to stand at room temperature for a period of time, absorb some moisture. Thus, before actually using the plaster molds they were conditioned by pouring molten metal into them prior to use in order to drive off absorbed moisture.

The metal for the constant volume samples was derived from heats melted in a 3000-cycle lift-coil induction furnace, and a gas-fired furnace using clay-graphite crucibles. The induction melts weighed approximately 25 lb. and the gas-fired melts approximately 15 lb. Commercial 356 alloy ingot melting stock was used throughout the investigation. The Federal Specification (QQ–A–601b) of this alloy is shown in the following table.

*Table 1.—Chemical Composition of 356 Alloy*

| Element: | | Wt. percent |
|---|---|---|
| Silicon | | 6.5–7.5 |
| Magnesium | | 0.2–0.4 |
| Iron | max | 0.6 |
| Copper | max | 0.2 |
| Manganese | max | 0.35 |
| Zinc | max | 0.3 |
| Titanium | max | 0.25 |
| Other elements, each | max | 0.05 |
| Other elements, total | max | 0.15 |
| Aluminum | | Remainder |

The apparatus for creating the reduced pressure during solidification of the constant volume sample is shown in FIG. 3. It conforms basically with the reduced pressure apparatus described by W. A. Baker in an article entitled "Microporosity in Magnesium Alloy Castings" and published in J. Inst. Metals, 71, 165–204, 1945. It consists of a mechanical vacuum pump 15, a mercury monometer or vacuum gauge 16, a needle valve 17, a main vacuum control valve 18, a vacuum release valve 19, a rubber hose lead 20, a Pyrex glass vacuum chamber 21 partly filled with shot and a rubber O-ring gasket 22. The mold 10 was embedded in shot up to its flange to provide a heat sink.

The test procedure are practiced in this invention was as follows. After 90 to 120 grams of metal taken from a melt were poured into the constant volume sample mold, the pouring basin was immediately removed and the vacuum chamber was closed. The main vacuum valve was opened and a pressure of 80 mm. of mercury on the monometer was obtained by properly adjusting the needed valve. After 4 minutes, the main valve was closed, the vacuum release valve was opened, the test mold was removed from the vacuum chamber and quenched in water. The constant volume portion was then broken away from the riser and weighed. The gas content was determined either by use of a specially calibrated balance or by consulting a graph (FIG. 9) prepared to show the relationship between sample weight and gas content.

To determine how accurately the volume of the sample can be reproduced, 28 constant volume specimens were cast from two degassed induction furnace melts. Two series of constant volume molds dissimilar in volume were used in this investigation. All the castings were solidified at atmospheric pressure. Thereafter, these specimens were weighed in air and ethyl alcohol (U.S.P. 200 proof). From these data their volume and density were then determined by Archimedes' technique. The results are shown in the following table:

*Table 2.—Reproducibility Tests Results*

SERIES 1

| Specimen No. | Vol., cc. | Vol. Error, cc. | Density,[1] gm./cc. | Density,[2] gm./cc. | Density Error, gm./cc. |
|---|---|---|---|---|---|
| 1 | 19.792 | −0.018 | 2.676 | 2.675 | −0.001 |
| 2 | 19.819 | +0.009 | 2.676 | 2.677 | +0.001 |
| 3 | 19.815 | +0.005 | 2.679 | 2.680 | +0.001 |
| 4 | 19.769 | −0.041 | 2.680 | 2.674 | −0.006 |
| 5 | 19.756 | −0.054 | 2.680 | 2.673 | −0.007 |
| 6 | 19.801 | −0.009 | 2.678 | 2.677 | −0.001 |
| 7 | 19.819 | +0.009 | 2.678 | 2.679 | +0.001 |
| 8 | 19.778 | −0.032 | 2.680 | 2.675 | −0.005 |
| 9 | 19.853 | +0.043 | 2.678 | 2.684 | +0.006 |
| 10 | 19.823 | +0.013 | 2.679 | 2.681 | +0.002 |
| 11 | 19.847 | +0.037 | 2.677 | 2.682 | +0.005 |
| 12 | 19.830 | +0.020 | 2.678 | 2.681 | +0.003 |
| 13 | 19.828 | +0.018 | 2.680 | 2.682 | +0.002 |
| 14 | 19.769 | −0.041 | 2.678 | 2.673 | −0.005 |
| 15 | 19.829 | +0.019 | 2.678 | 2.680 | −0.002 |
| 16 | 19.815 | +0.005 | 2.671 | 2.672 | +0.001 |
| 17 | 19.840 | +0.030 | 2.668 | 2.672 | +0.004 |
| 18 | 19.823 | +0.013 | 2.663 | 2.665 | +0.002 |
| 19 | 19.790 | −0.020 | 2.653 | 2.650 | −0.003 |

SERIES 2

| 20 | 19.472 | −0.002 | 2.680 | 2.680 | 0 |
| 21 | 19.503 | +0.029 | 2.679 | 2.683 | +0.004 |
| 22 | 19.473 | −0.001 | 2.680 | 2.680 | 0 |
| 23 | 19.443 | −0.031 | 2.677 | 2.672 | −0.005 |
| 24 | 19.452 | −0.022 | 2.680 | 2.677 | −0.003 |
| 25 | 19.461 | −0.013 | 2.680 | 2.678 | −0.002 |
| 26 | 19.506 | +0.032 | 2.679 | 2.384 | +0.005 |
| 27 | 19.487 | +0.013 | 2.681 | 2.682 | +0.001 |
| 28 | 19.466 | −0.008 | 2.681 | 2.679 | −0.001 |

Average vol. of series 1 sample = 19.810 cc.
Average vol. of series 2 sample = 19.474 cc.
[1] Density value obtained on individual specimens by Archimedes' method.
[2] Density value calculated by assuming the averaged vol. of the samples in each of the series.

It is evident from this table that the constant volume sample can be reproduced within narrow limits. The maximum volume and density error obtained for the 20-cc. sample was 0.054 cc. and 0.007 gm./cc., respectively. These errors represent a gas content error of 0.004 cc. of gas per 100 grams of metal at standard conditions of pressure and temperature (STP).

Standard volume and density deviations obtained were 0.028 cc. and 0.003 gm./cc., respectively. These figures are equivalent to a gas content error of 0.002 cc. of gas per 100 grams of metal (STP).

On the basis of this reproducibility data, a balance having a sensitivity of ±0.05 gram and a capacity in excess of 60 grams is adequate for all sample weighing. Such balances are currently available and are sufficiently rugged for foundry floor use.

The weight of the constant volume sample is utilized in connection with the curve of FIG. 9 to determine the gas content of the melt from which it is taken. In this curve, the weight of the constant volume sample is plotted against the gas content of the melt metal at a standard temperature and pressure, this gas content being expressed in cubic centimeters per 100 grams of the metal. The sampling procedure is completed by reading from this curve the gas content corresponding to the weight.

The ordinates of the curve of FIG. 9 were obtained by solving the following equation:

Cc. of gas per 100 gm. of metal (STP)

$$= \frac{P_2}{P_1} \times \frac{T_1}{T_2} \times 100 \left( \frac{V_1}{W_1} - \frac{1}{D_0} \right)$$

where $T_1 = 273°$ K.
$T_2 =$ Solidus temperature of the alloy, 852° K.
$P_1 = 760$ mm. of Hg
$P_2 =$ Solidification pressure (vacuum pressure+metallostatic pressure), 92.8 mm. of Hg
$V_1 =$ Volume of reduced pressure sample, 20 cc.
$W_1 =$ Weight of reduced pressure sample, gm.
$D_0 =$ Density of gas free 356 alloy, 2.68 gm./cc.

The derivation of this equation is set forth on page 64 of "Modern Castings," January 1959.

It is evident from the foregoing that the above-described test for the gas content of a metal melt can be performed rapidly. In actual practice, it has been found that it requires only about 4½ minutes. Its simplicity and rapidity are such that it is useful as a production test for controlling the gas content of aluminum-base alloy melts in an industrial foundry.

To determine the influence of various factors on the accuracy of the test, data was derived and plotted to show the relation between (1) the temperature in different parts of the sample and the time following its casting (FIG. 4), (2) the sensitivity of the sample of gas present in the melts at various time intervals (FIG. 5), (3) specimen and riser density (FIG. 7), and (4) the sampling temperature and the gas content of the constant volume sample (FIG. 8).

To determine the solidification time and the temperature gradients within the constant volume casting when poured at 1300° F., the cooling curves of FIG. 4 were obtained. These curves were obtained by the use of a multipoint temperature recorder and three Chromel-Alumel thermocouples. One thermocouple was positioned in the center of the riser and the other two were stationed just inside the top and bottom surfaces of the constant volume specimen.

From these curves it can be seen that solidification of the specimen begins after approximately 9 sec. and ends slightly after 2 min. Complete solidification of the casting occurs after approximately 6¼ min.

Although complete solidification of the casting occurs after approximately 6¼ min. the casting can be removed from the vacuum chamber after 4 min. and the riser knocked off without producing any harmful effects. This is because, at that time, the specimen segment of the casting is completely solid and the riser segment, except for its center portion, is also solid.

Thermal gradient studies show that directional solidification occurs in the constant volume segment of the casting. This facilitates feeding of the test sample. It should be noted also that the desired vacuum level is established in the chamber before solidification of the constant volume casting begins. Thus solidification of the sample begins after about 9 sec. with the reduced pressure tester of FIG. 3, a pressure of 8 mm. of mercury is obtained in about 8 sec.

To determine the sensitivity of the constant volume sample to loss or pickup of gas in a melt, samples were cast at various time intervals from degassed and gassed heats of metal melted in the induction and gas-fired furnaces. All the samples were solidified at a reduced pressure of 80 mm. of mercury.

The volume of gas in the samples at standard conditions of pressure and temperature (STP) was calculated from the measured weight and the standard density of gas-free 356 alloy. These calculations were made by the use of the formula:

Cc. of gas per 100 gm. of metal (STP)

$$= \frac{W_0 - W_1}{D_0} \times \frac{100}{W_1} \times \frac{T_1}{T_2} \times \frac{P_2}{P_1}$$

where $W_0 =$ Weight of gas free sample, gm.
$W_1 =$ Weight of reduced pressure sample, gm.
$D_0 =$ Density of gas free 356 alloy, 2.68 gm./cc.
$T_1 = 273°$ K.
$T_2 =$ Solidus temperature of the alloy, 852° K.
$P_1 = 760$ mm. of Hg
$P_2 =$ Solidification pressure (vacuum pressure+metallostatic pressure), 92.8 mm. of Hg.

The curves of FIG. 5 were plotted from this data. They show that the constant volume sample is sensitive to loss or pickup of gas in the melt.

FIG. 6 shows a series of sections of constant-volume specimens having gas contents over the range 0.467 to 0.004 cc. of gas (STP) per 100 grams of metal. Sections of the risers at the opposite ends of the range are also shown. In FIG. 7 each point represents a specimen and riser density value obtained from one casting. The full line curve represents the theoretical relation. Obviously, all the points are slightly below the line. Metallographic work shows the presence of shrinkage voids in the riser, which may be responsible for the excessively low riser density values. The density and gas content calculations shown in FIG. 7 were made with the assumption that all voids present in the specimen and riser were due solely to entrapped gas.

The curves of FIG. 8 shows the relation between sampling temperature and the gas content in cc. per 100 grams (STP). These curves provide no evidence that there is any significant gas loss at high sampling temperatures. Since the goal of the constant volume sample test for gas in aluminum melts is the detection of the point where the gas level approaches zero, it is apparent that loss of gas from a melt of low gas content cannot be a factor in the test.

We claim:
1. In an apparatus for the rapid and accurate foundry measurement of gas in at least one of the metals from a group consisting of aluminum, copper, magnesium, and their alloys, said apparatus including a vacuum pump, a vacuum gauge, valve means for controlling the vacuum under which a metal is solidified when its gas content is to be measured, a flexible hose leading to a mold for receiving said metal in molten condition, the combination therewith of the improvement in said mold whereby an accurate volume of such metal is provided in which on solidification the likelihood of shrinkage voids being formed is reduced and at least a portion of said mold is available for repeated usage, said mold comprising at least three separable parts which are in substantial vertical alinement, an upper one of said parts being a riser type supply reservoir section of thermally nonconductive material and circular cross-section having a generally axial admission opening leading into an enlarged space for retaining the metal when molten, said enlarged space being in the approximate shape of a truncated cone having its side walls sloping downwardly and outwardly, a gate section contiguous to and below said reservoir part, of a refractory thermally nonconductive material of much less axial depth than said reservoir part and constituting a bottom for at least a portion of said reservoir but separable therefrom and having an axial opening, at least an upper portion of the walls of the axial opening in said gate section being cylindrical and at least about .3 of an inch in diameter to reduce the danger of shrinkage voids being formed in cooling, a lower mold section being of frustro-conical shape having the side walls thereof tapered outwardly and upwardly about 6° to an extended vertical axis from a bottom of smaller diameter than the top of said lower mold section, and being of refractory material separable from said gate section, and being of less volume than said supply reservoir, said gate section constituting a cover for said lower mold section and a lower portion of said gate section having a sharp hot circular edge formed between its bottom surface and upwardly and radially outwardly tapered side walls of the axial opening in said lower portion of said gate section, whereby said three mold parts assist in the production of a precise volume substantially free of shrinkage voids for use in the measurement of gas contained therein.

2. An apparatus according to claim 1 in which a fourth and uppermost funnel shaped separable section is of refractory plaster type material comprising about 70% silica and about 30% gypsum having an outside diameter of about 3 inches containing an axial opening with tapered walls leading toward said axial admission opening in said riser type reservoir section, said axial opening being about .875 inch in diameter, the volume of said reservoir being larger than that in said lower mold section, both the funnel shaped section and the reservoir section having an outside diameter of about 3 inches with a base of the reservoir in said section about 1.625 inches in internal diameter, said gate section and lower mold section being of about the same outside diameters and made of a resin bonded silica sand, said gate section having a depth of about $5/16$ of an inch, the volume of metal to be received by said lower mold section being about 20 cubic centimeters with its axial depth about 2 inches.

3. An apparatus according to claim 2 in which said sections are placed in a heat resistant chamber filled with shot up to adjacent the level of said gate section, and said reservoir section when containing hot liquid metal being connected to said vacuum pump by said flexible hose for the purpose of removing gas from the poured metal.

References Cited in the file of this patent

UNITED STATES PATENTS

| | | |
|---|---|---|
| 1,505,343 | Heath | Aug. 19, 1924 |
| 1,594,546 | Mojonnier | Aug. 3, 1926 |
| 2,303,655 | Nutter | Dec. 1, 1942 |